United States Patent Office 3,555,765
Patented Jan. 19, 1971

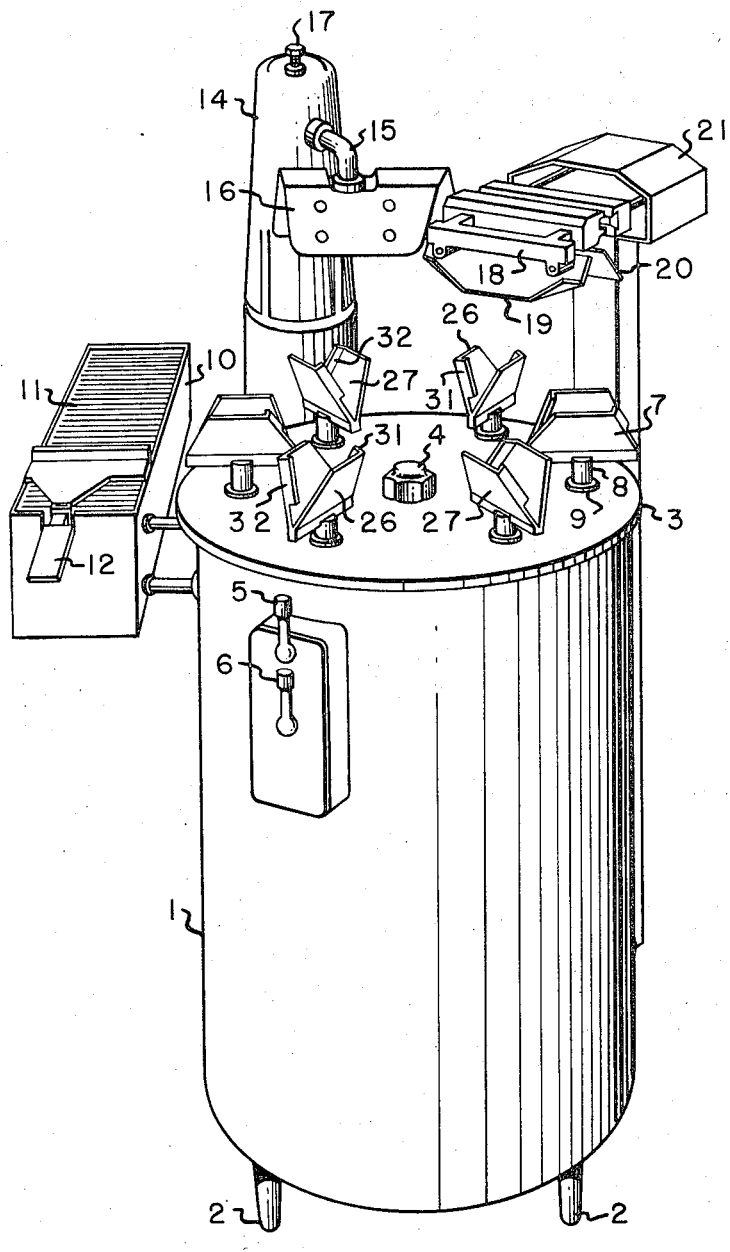
FIG.-1-

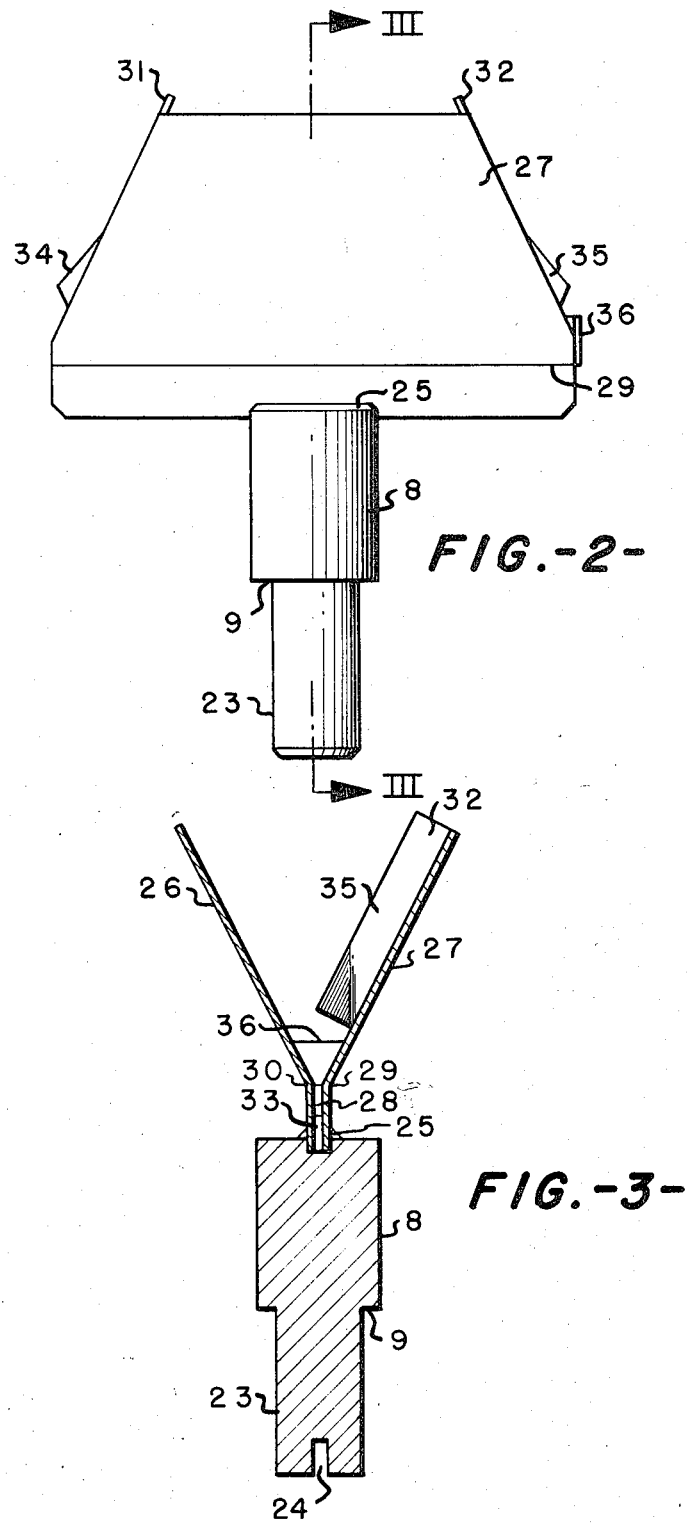

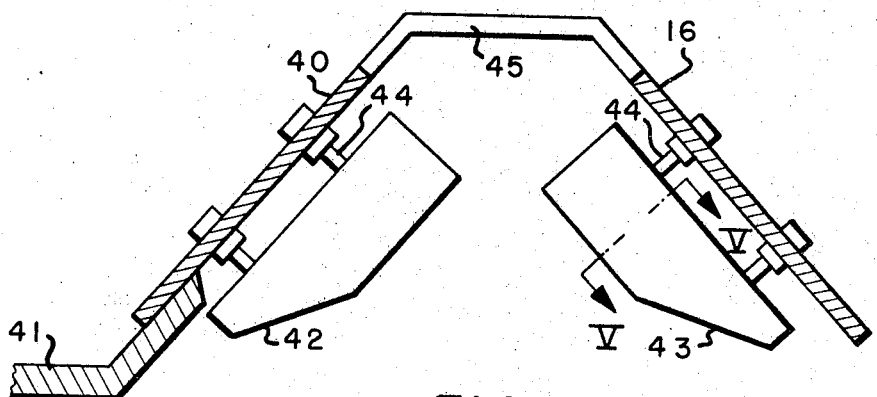
FIG.-4-
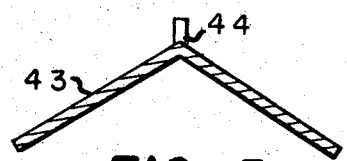
FIG.-5-
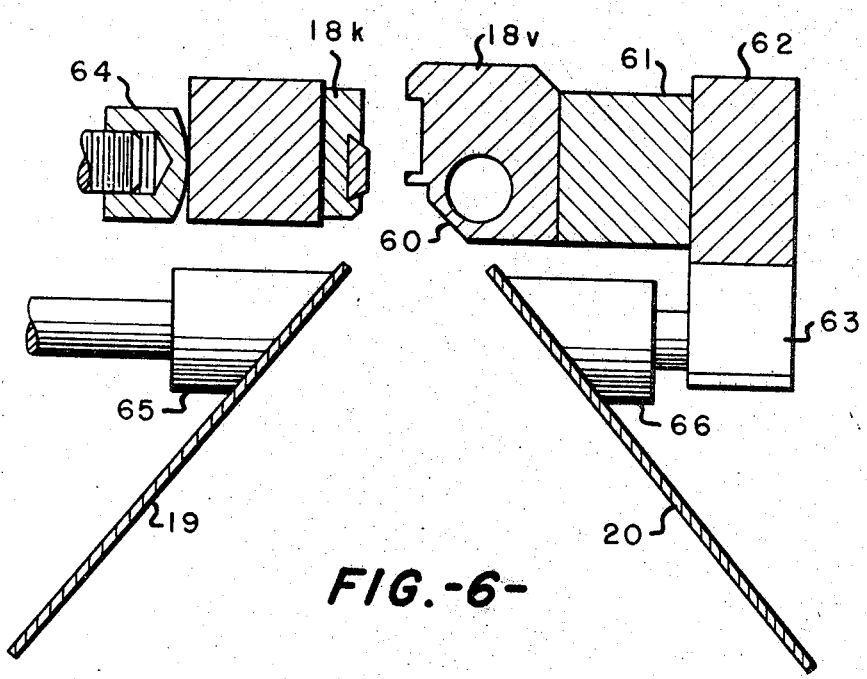
FIG.-6-

3,555,765
METHOD OF PRODUCING FILLING AND CLOSING TETRAHEDRAL PACKAGES AND A DEVICE FOR CARRYING OUT THE METHOD
Lars Malte Roland Wettlen, Lomma, Sweden, assignor to AB Tetra Pak, Lund, Sweden, a Swedish company
Continuation of application Ser. No. 456,447, May 17, 1965. This application Mar. 15, 1968, Ser. No. 713,542
Claims priority, application Sweden, May 28, 1964, 6,463/64
Int. Cl. B65b 3/00, 7/06, 43/26
U.S. Cl. 53—29                                            4 Claims

ABSTRACT OF THE DISCLOSURE

A machine which sequentially rotates a number of holders with package blanks from an opening station to a material filling station wherein the package blanks are filled. Then the filled package blanks are rotated to a heat sealing station whereat the filled package blanks are formed into filled tetrahedron packages.

---

This is a continuation of application Ser. No. 456,447 filed May 17, 1965.

The present invention relates to the packaging art in which blanks of stiff material having inner sides of heat sealing plastic being used for the packages.

It is generally known to produce tetrahedral packages by the use of web-shaped material which is advanced continuously to a packaging machine. In the case of this method the material is subjected in the machine to a conversion so as to form a tube into which the material for which the package is intended is introduced continuously. Finally, the filled tube is converted by special means into tetrahedral packages. The method and the devices which are required for carrying out said method probably already satisfy the highest requirements in the technical design. However, the provision of these machines involves an investment of capital which in certain cases cannot be considered justified. This is, for example, the case where the production capacity of a plant, where a packaging machine is intended to be used, is relatively small. A small, cheaper machine of les capacity may be a more advantageous solution to the packaging problem of such a plant.

The present invention refers to such a packaging machine and is directed to a method of producing, filling and closing tetrahedral packages, characterized by the fact that flat bag-shaped blanks of stiff material having inner sides of heat sealing plastic, which are produced in advance, are caused by special means to expand its opening 71 for facilitating the filling of the product 72 to be packed. After the package has been filled, the latter is caused to assume tetrahedral shape, the opening being closed and heat sealed in an edge zone 74, whereby the closed and sealed opening will form an edge in the tetrahedron produced, said edge being opposite the bottom 75 of the original bag.

The invention further refers to a device for carrying out the abovementioned method, characterized, on the one hand, by a rotatable disk provided with a number of holders for the packages or package blanks and, on the other hand, by means for rotating the disk step by step, each step corresponding to a revolution divided by the number of holders, so that after completing a step of the disk an empty package is always disposed under a filling member and a filled but not closed package is disposed at a sealing member.

Other objects and advantages of the invention will be clearly apparent as the specification proceeds to describe the invention with reference to the accompanying drawings in which:

FIG. 1 is a perspective view of the overall machine according to the invention;
FIG. 2 is a blown up view of a package holder;
FIG. 3 is a cross-section view taken in line III—III of FIG. 2;
FIG. 4 is a view of the package blank expander mechanism;
FIG. 5 is a view taken in line V—V of FIG. 4; and
FIG. 6 is an exploded partially cross-sectioned view of the package closing and sealing members.

Referring to FIG. 1, which shows a packaging machine according to the invention, the drive of the machine is housed in a body 1 standing upright on legs 2. A disk 3 is rotatable clock-wise around a center hub 4. By means of an upper operating means 5 either step-wise continuous rotation of the disk 3 (the operating means 5 in left hand position) or intermittent rotation (right hand position) can be obtained. A lower operation means 6 is intended for use as an emergency stop. For receiving packages or package blanks a number, here six, of holders 7 are mounted on the disk 3 by means of pegs 8 welded or otherwise fixed to the holders 7 which are inserted into sockets (not shown) in the disk 3. The holders 7 are fixed in predetermined positions by flanges 9 and by notches in the extensions, not shown, of the pegs 8 within the body 1. The body 1 has fixed to it a box 10 containing bag-shaped package blanks 11. On the box 10 there is further mounted a stamping device 12 for stamping dates on the packages 11.

A hood 14 with a clamping screw 17 houses means for supplying the material with which the package is intended to be filled. For the purpose of conducting the material down into the packages a bent tube 15 having a downwardly facing mouth is arranged in an opening in a guiding device 16 for expanding the opened part of the packages. Further, sealing members are provided in the form of sealing jaws 18. The driving members of the sealing device are situated under a hood 21. Special guiding surfaces 19 and 20 are intended to give the package a tetrahedral shape in connection with the heat sealing.

FIGS. 2 and 3 show the bucket-shaped member or holder 7, in the continuation referred to as a holder, which is intended to hold the package blank or package during the filling and closing processes. The extension 23 of the peg 8 is intended to be disposed in one of the sockets of the disk 3 intended therefor. The position of the holder is fixed, on the one hand, by the flange 9, which will be seated against the upper surface of the disk 3 and, on the other hand, by the recess 24 which engages a suitable member. On the peg 8 there are mounted by means of a weld 25 or in some way two sheets 26 and 27. In the region adjacent the peg 8 the sheets are arranged in parallel slightly spaced, so that a small intermediate space 28 is formed. At some distance from the peg 8 the sheets are bent along lines 29 and 30, respectively. Above these lines the sheets will diverge symmetrically from a line of symmetry indicated in FIG. 3. Thereby an angle is produced between the sheets, which angle is intended to correspond to the angle between two adjacnt sides of a finished package tetrahedron. Furthermore, the sheet 26 is provided with an edge surface 31 and the sheet 27 with an edge surface 32. These edge surfaces 31, 32 are bent in towards the symmetry line of the holder substantially at 90° to the sheets 26 and 27, respectively. At their bottom parts 34, 35 they are, however, slightly flared. The end surfaces 31, 32 are intended to form support surfaces for a package blank which is placed with its lower closed part in the space 28. For the purpose of limiting the introduction of the package blank into the space 28 to a convenient depth a narrow strip of sheet 33 is provided in the lower part of the space 28. At one end the holder is provided with a small end wall 36, the purpose of which is to restrict the introduction of a package blank into the holder laterally.

In FIGS. 4 and 5 it is shown more closely how the device 16 for expanding the opening of the package blanks (bags) is intended to be realised. The operative members of the device are two bent sheets 42 and 43 which are fixed by means of stays 44 to a frame 40 having an opening 45 for the filling tube 15. The frame 40, also manufactured from bent sheet material, is in turn fixed by means of stays 41 in any suitable way.

FIG. 6 shows closing and sealing members. The heat sealing members consist of a heating jaw 18v and a clamping jaw 18k. The stationary heating jaw is fixed by members 61, 62, 63, while the clamping jaw 18k is moveable in response to a pressure member 64. Under the sealing jaws guiding surfaces 19, 20 are mounted by fixing means 65, 66. For the purpose of extending the guiding surface 20 the heating jaw 18v is bevelled so as to provide a surface 60.

The packaging machine described functions briefly as follows. A complete cycle of operation consists in placing an empty packaging blank (bag) in a holder, conveying the empty bag to a filling member, expanding the opening of the bag, filling into it the materal for which the package is intended, conveying the filled package to a closing member, converting the package into tetrahedral form, closing the package and finally delivering the product as packages. Said cycle of operation may be subdivided into three fractional cycles or stages. The first stage consists in placing an empty package in a holder and conveying said empty package to a filling member. Stage number 2 is concerned with filling the empty bag and conveying the filled package to the closing members. Finally, stage number 3 is concerned with converting the package into tetrahedral form, closing and delivering the finished tetrahedral package.

A cycle of operation is initiated by the operator taking a bag-shaped package blank 11 from the lower part of the box 10, the stamping means 12 applying a date stamp on the package blank (bag) 11. The bag is placed in a holder 7 in such a way that the lower closed part of the bag is brought down into the space 28 and is seated on the piece of sheet material 33. The bag is besides moved into engagement with the end wall 36 facing the centre of the machine. The lateral surfaces of the bag are now supported by the lower portions 34 and 35 of the edges 31 and 32, so that the bag will be upright. By turning the operating handle 5 to the position desired the disk 3 and the holder 7 mounted on the disk are caused to rotate in a clock-wise direction. When a package blank has been advanced into a position under the filling members, stage number 1 may be considered terminated. Stage number 2 is initiated by a holder 7 containing the bag to be filled which is placed under the filling members being pushed upwards by means not shown, which actuate an extension of the peg 8. During the movement upwards the upper corners of the bag will be moved against the bevelled guiding surfaces 42 and 43 (FIGS. 4 and 5). Thereby the said corners will be moved towards each other, which for obvious reasons will cause the opening of the bag to be expanded. Filling of the package is now possible and is accomplished by members 15 provided therefor. When the holder 7 is lowered into normal position the package loses its contact with the guiding surfaces 42 and 43 but will still maintain its shape as determined by the guiding surfaces. Substantially the whole of the support surfaces 31 and 32 (FIGS. 2 and 3) will now support the package along the lateral edges thereof facing said supporting surfaces. The rotation of the disk 3 continues and stage number 2 is terminated, when the filled package has occupied a position under the closing members. In a way similar to that at the filling operation the filled package is now pushed upwards, this time towards the closing members, this motion initiating stage number 3. Due to the package during the movement upwards being moved against the guiding surfaces 19, 20 and 60 (FIG. 6) the package is caused to assume approximately tetrahedral shape. The complete tetrahedral shape is imparted to the package by the clamping jaw 18k being pressed against the heating jaw 18v. The heating jaw is heated electrically according to the constant or impulse heat principle. The plastic situated on the inner side of the packaging material melts and sticks together owing to the heat, whereby the package is sealed. When the package has been sealed the holder returns to the normal position. The package is now seated in the holder with its sides against the lateral surfaces 26 and 27 of the holder. The edges of the package are approximately completely withdrawn from the support surfaces 31 and 32. The rotation of the disk 3 continues and the finished package is discharged, whereby the whole cycle of operation is completed.

It will be understood that the device and the method described above for producing, filling and closing a package forms only a preferred embodiment of the invention, which is restricted only by the following claims.

That which is claimed is:

1. Apparatus to produce filled tetrahedron containers comprising: a frame, a disc member rotatably supported on said frame, a plurality of package holders supported on said disc member, means operably associated with disc member to fill package blanks in said holders, means operably associated with said disc to provide a heat sealed transverse seal to seal said filled blank package and means to rotate said disc to sequentially advance said filled package blanks from said filling means to said heat sealing means, said package holders including two flat members diverging from one another to form an angle therebetween corresponding to the angle between two sides of a tetrahedron with the bisector of said angle coinciding with a vertical plane through the apex of the angle, support means operably associated with said package holders to support said blank packages in a vertical position in said holders between said two diverging members, each of said two flat members each having at least one flange extending from the outer edge thereof toward the center of the holder, said disc having a plurality of openings therein each of said holders having a peg thereon telescoped in one of said plurality of openings and means operably associated with said holder to move said holder in an upward direction.

2. The structure of claim 1 wherein said filling means includes a means to expand said packages when said holders are moved upwardly.

3. The method of forming, filling and sealing packages comprising forming flexible packaging material into open-ended tubes, closing one end of each tube, transferring each tube closed at its said one end to a holder in which the tube is positioned upright with its closed end down, filling each tube while held by its holder through its open upper end, positioning each holder for closing the upper end of the filled tube held thereby in a plane at an angle to the closure at the lower end of the tube so that the package formed therefrom has the shape of a tetrahedron and closing the upper end of each filled tube while held by its holder.

4. The method of forming, filling and sealing packages comprising conveying a succession of tube holders one after another through an endless path, forming flexible packaging material into a succession of individual open-ended tubes, forming a seal at one end of each tube, transferring each tube sealed at its said one end to a holder proceeding along said endless path, the tube being positioned upright in said holder with the sealed end of the tube down, filling the tubes held by the holders through the open upper ends of the tubes as the holders proceed along their said path, positioning each holder for forming the seal at the upper end of the filled tube held thereby in a plane at an angle to the seal at the lower end of the tube so that the package formed therefrom has the shape of a tetrahedron, forming seals at the upper ends of the filled tubes held by the holders as the holders proceed farther along their said path to complete the formation of the tubes into packages, and removing the packages from the holders.

References Cited

UNITED STATES PATENTS

| | | | |
|---|---|---|---|
| 2,241,943 | 5/1941 | Berch | 53—39X |
| 2,684,191 | 7/1954 | Dolman | 53—188 |
| 3,236,021 | 2/1966 | Wagner et al. | 53—183X |
| 3,347,017 | 10/1967 | Allen et al. | 53—375X |

FOREIGN PATENTS 1,054,901   4/1959   Germany.

TRAVIS S. McGEHEE, Primary Examiner

NEIL ABRAMS, Assistant Examiner

U.S. Cl. X.R.

53—37, 183, 266